United States Patent
Ikebe et al.

(10) Patent No.: US 8,801,921 B2
(45) Date of Patent: Aug. 12, 2014

(54) METHOD OF PRODUCED WATER TREATMENT, METHOD OF WATER REUSE, AND SYSTEMS FOR THESE METHODS

(75) Inventors: Hiroaki Ikebe, Narashino (JP); Hiroshi Yokohata, Narashino (JP); Masaaki Sakurai, Narashino (JP); Toru Morita, Osaka (JP)

(73) Assignees: Toyo Engineering Corporation, Tokyo (JP); Sumitomo Electric Industries, Ltd., Osaka-shi (JP)

( * ) Notice: Subject to any disclaimer, the term of this patent is extended or adjusted under 35 U.S.C. 154(b) by 786 days.

(21) Appl. No.: 12/657,530

(22) Filed: Jan. 22, 2010

(65) Prior Publication Data

US 2010/0264068 A1  Oct. 21, 2010

(30) Foreign Application Priority Data

Apr. 20, 2009  (JP) .................. 2009-101765

(51) Int. Cl.
 *C10G 33/06* (2006.01)
 *C10G 1/04* (2006.01)
(52) U.S. Cl.
 USPC .................. 208/391; 210/799; 196/46.1
(58) Field of Classification Search
 USPC .......... 208/390, 391, 187; 196/46.1; 210/799, 210/805
 See application file for complete search history.

(56) References Cited

U.S. PATENT DOCUMENTS

| | | | | |
|---|---|---|---|---|
| 3,554,378 A | * | 1/1971 | Kohl | 210/321.83 |
| 4,229,297 A | * | 10/1980 | Nohmi et al. | 210/654 |
| 4,780,211 A | * | 10/1988 | Lien | 210/644 |
| 2003/0136737 A1 | * | 7/2003 | Glynn | 210/636 |
| 2004/0222156 A1 | * | 11/2004 | Yu et al. | 210/650 |
| 2006/0032630 A1 | * | 2/2006 | Heins | 166/266 |
| 2008/0245739 A1 | * | 10/2008 | Honji et al. | 210/670 |

FOREIGN PATENT DOCUMENTS

| | | |
|---|---|---|
| JP | 11-244668 | 9/1999 |
| JP | 2007-185599 | 7/2007 |
| JP | 2008-279435 | 11/2008 |

OTHER PUBLICATIONS

Cholet, Henri (2008). Well Production Practical Handbook (New Edition Expanded).. Editions Technip. p. 266.*
Journal of the Japanese Association for Petroleum Technology, vol. 69, No. 6 (Nov. 2004) pp. 612-620.
Journal of the Japanese Association for Petroleum Technology, vol. 70, No. 6 (Nov. 2005) pp. 522-525.
Journal of Canadian Petroleum Technology, vol. 43, No. 9 (Sep. 2004) pp. 1-4.

* cited by examiner

*Primary Examiner* — Renee E Robinson
(74) *Attorney, Agent, or Firm* — Flynn, Thiel, Boutell & Tanis, P.C.

(57) ABSTRACT

A method of produced water treatment in an in-situ recovery method of producing bitumen from oil sand, the method has the steps of: separating bitumen from bitumen-mixed fluid so as to leave produced water, the bitumen-mixed fluid having been recovered from the oil sand wells; and filtering the produced water via a microfiltration membrane made of polytetrafluoroethylene.

15 Claims, 8 Drawing Sheets

Fig. 1

*Fig. 3(b)* Cross Flow Filtration

*Fig. 3(a)* External-pressure Deadend Filtration

Fig. 8 Conventional Flow (1)

Fig. 9

METHOD OF PRODUCED WATER TREATMENT, METHOD OF WATER REUSE, AND SYSTEMS FOR THESE METHODS

FIELD OF THE INVENTION

The present invention relates to a method of water treatment in an in-situ recovery method of producing bitumen from oil sands, a method of water reuse, a system of the produced water treatment, and a water reuse system.

BACKGROUND OF THE INVENTION

Bitumen recovered from oil sands as one of the petroleum resources has been regarded only as a preliminary or alternative resource for the next generation until now. Even though the bitumen itself is inferior in quality, products obtained from the bitumen have strong competitiveness to those obtained from crude oil. Further, a possibility of bitumen as an alternative to crude oil is also rising from a viewpoint of cost. Besides, Canadian oil sands have a good reputation for their overwhelming reserve that is almost equal to that of Saudi Arabia's crude oil. For example, the hydrocarbon reserve in Alberta State and its neighbor area in Canada is one of the largest reserves in the world. Above all, different from geopolitically unstable areas such as the Middle East and African countries, Canada has extremely low investment risks. To ensure a stable energy supply is an extremely important task for resource-poor Japan and any other country. From this point of view, therefore, Canada has been ranked as a current supply area of valuable petroleum resources.

In the production of bitumen from the oil sands, recently, the bitumen located at depths in which development by surface mining is difficult to conduct, has gotten much attention. As a method capable of realizing the recovery of bitumen from oil sands located at these depths, the in-situ recovery method attracts attention, such as the SAGD (steam assisted gravity drainage) process and the CSS (cyclic steam stimulation) process. Thus, a technical development of the in-situ recovery method has been energetically advanced (see "Development of Canada oilsands—Future challenges", Kiyoshi Ogino, Journal of the Japanese Association for Petroleum Technology, Vol. 69, No. 6 (November 2004) pp. 612-620).

According to the in-situ recovery method, a high-temperature steam is injected into high viscosity oil in an oil sand layer, in which the oil is not able to flow at a normal temperature. The viscosity of the oil is reduced by the heat. Resultantly, aggregated high-temperature condensate and oil are recovered by the steam injection. Therefore, "water" for producing a large amount of high-temperature steam is required. In order to produce steam, for example, the SAGD process described below uses water of about three times as much as the amount of oil to be produced. Meanwhile, in Canada, the quantity of water intake that is allowed for use is limited by the severe environmental policies (regulation) in the states, and effluent-injecting layers having a sufficient capacity are not located in the neighbor area. Therefore, water recycling shall be applied (see "Water recycling for oil sands development", Nobutoshi Shimizu and Tsuneta Nakamura, Journal of the Japanese Association for Petroleum Technology, Vol. 70, No. 6 (November 2005) pp. 522-525).

Figure 8:
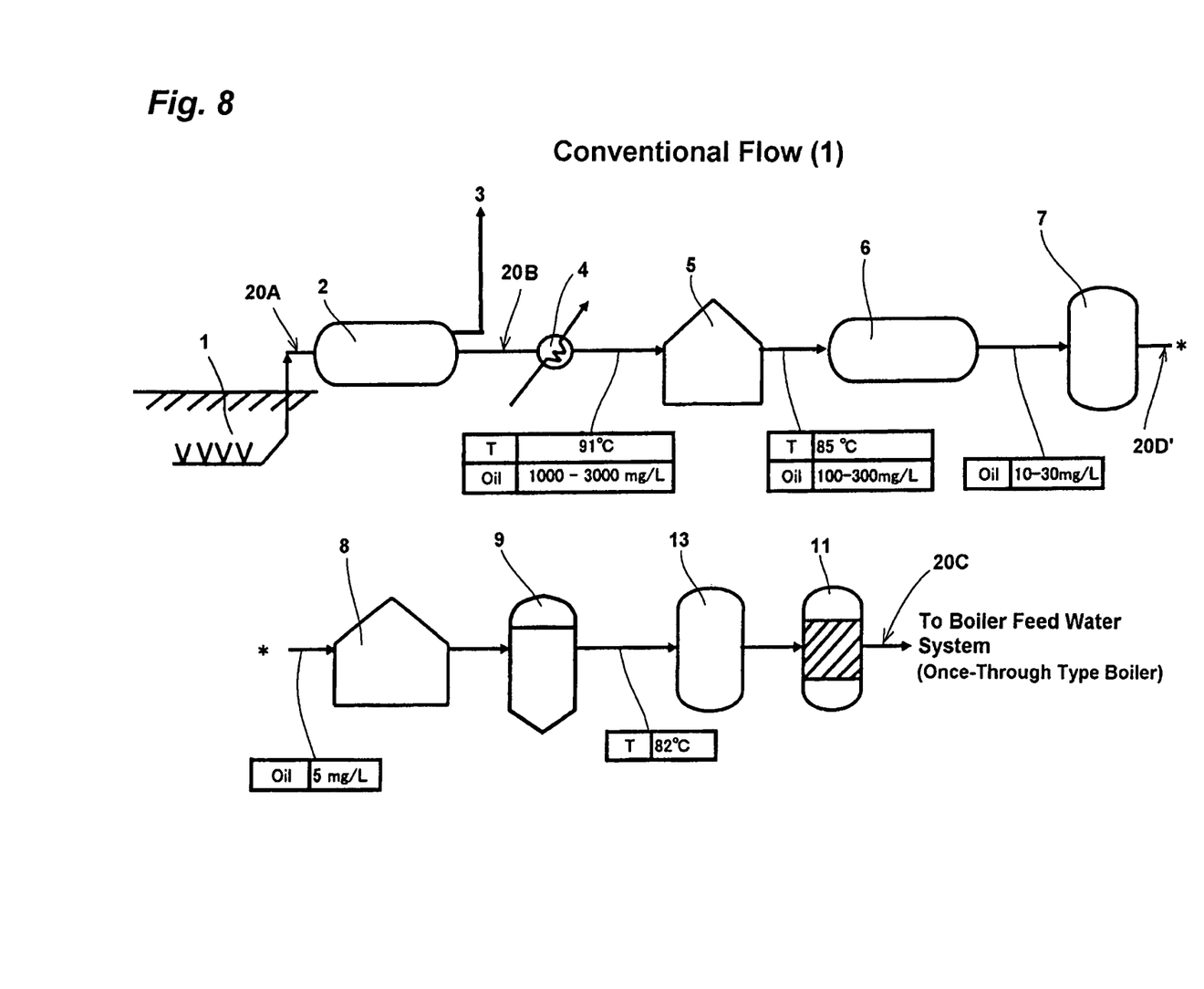
FIG. 8 is a flow diagram schematically showing each of steps involved in a method of reusing produced water according to the conventional flow (1).
Figure 9:
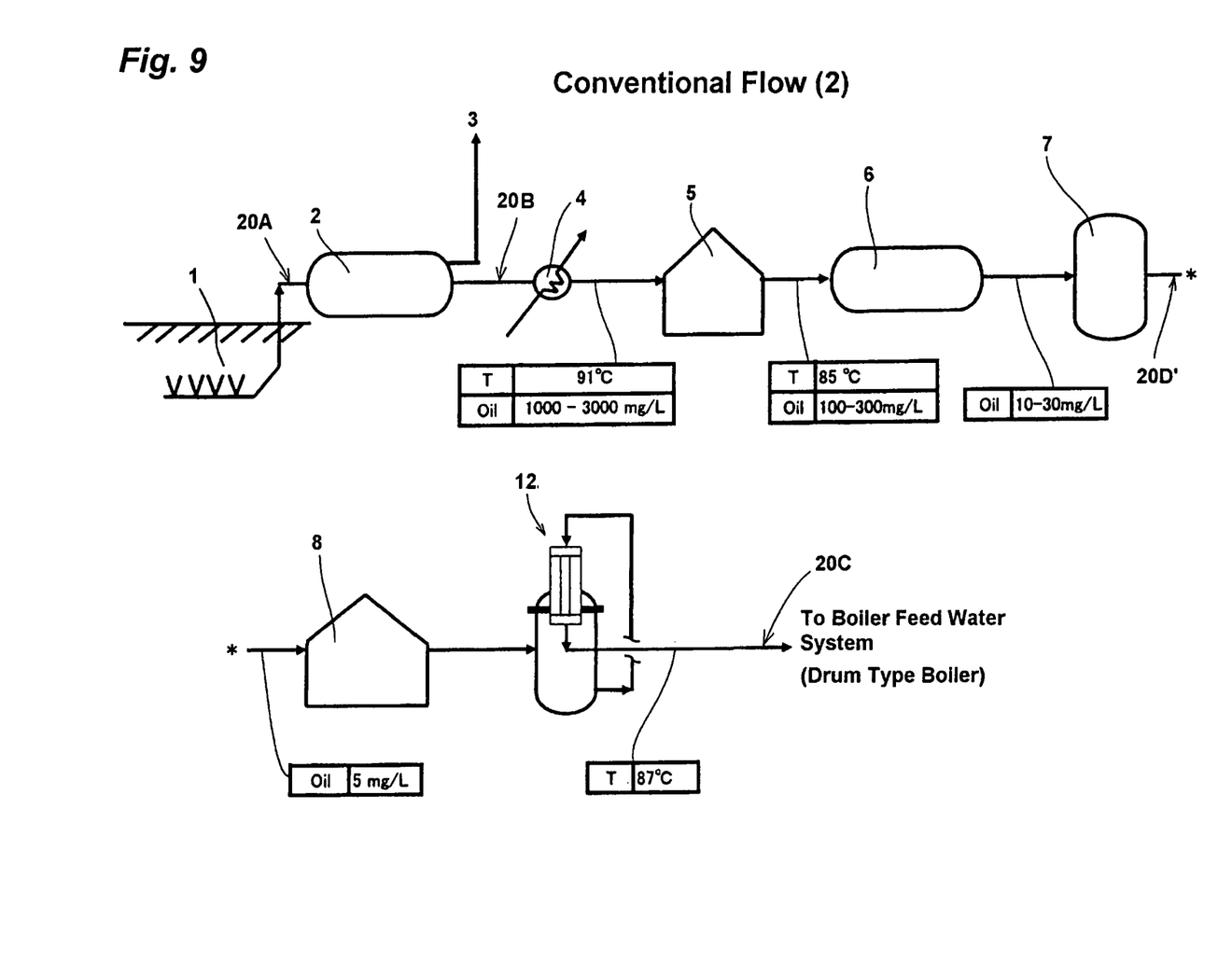
FIG. 9 is a flow diagram schematically showing each of steps involved in a method of reusing produced water according to the conventional flow (2).

In order to recycle the water to be used in the production of bitumen, the following methods have been used heretofore. Firstly, Flow (1) of a conventional method is explained (see FIG. 8). The bitumen-mixed fluid 20A recovered from the oil sand wells (oil sand layers 1) in the in-situ recovery method, is treated with a separator 2 including a knock-out drum and a treater, to extract bitumen 3. Then, an oil-containing water (which may be in some cases referred to "produced water") 20B separated from the bitumen is cooled to a predetermined temperature with a cooler (heat exchanger) 4, and then the oil is separated and removed from the water with the flow of a skim tank 5, an induced gas flotation 6, an oil removal filter 7 using walnut shell, and a deoiled tank 8. Thus, a conventional treated water 20D' is recovered. The oil-water separation according to this method is fundamentally gravity separation in which use is made of the difference in specific gravity between oil and water. In FIG. 8, the label "T" described in the box indicates a temperature of the fluid in the portion. The label "Oil" indicates the content of oil. (These have the same meanings in FIGS. 1 and 9.)

At the subsequent stage, a hardness component is removed from the treated water 20 D' with a flow of a lime softener 9, an after filter 13, and a weak acid cation softener 11. The resultantly-treated water is supplied to a once-through-type boiler (not shown) as a boiler feed water 20C. Recently, the following water treatment is also applied: pure water is produced by means of an evaporator 12 as a desalination process in place of a softening treatment in the above-described conventional flow (1), and the thus-produced water is fed to a drum-type boiler (not shown) as a boiler feed water 20C (see Flow (2) of another conventional method in FIG. 9).

In the conventional flow (1), however, a number of equipment and steps are required for oil-water separation, which result in a troublesome operation and a high cost of equipment with a difficult operation and maintenance. Further, there is reported a case example in which organic scales deposit in a heat exchanger and a boiler, thereby causing corrosion cracking due to thermal stress (see "Water recycling for oil sands development", Nobutoshi Shimizu and Tsuneta Nakamura, Journal of the Japanese Association for Petroleum Technology, Vol. 70, No. 6 (November 2005) pp. 522-525). It is assumed to be a primary cause that though oil droplets of a relatively large particle size can be separated, oil droplets of a small particle size or emulsified oil cannot be separated by gravity separation (see "TORR™— The Next Generation of Hydrocarbon Extraction From Water", M. J. Plebon, Journal of Canadian Petroleum Technology, Vol. 43, No. 9 (September 2004) pp. 1-4). On the other hand, in the conventional flow (2), when an evaporator is applied to the softening/desalination step of the subsequent stage, scale troubles caused by organic matters in a boiler arise. Therefore, scale troubles are still remaining obstacles to the advancement of these conventional methods (see "Water recycling for oil sands development", Nobutoshi Shimizu and Tsuneta Nakamura, Journal of the Japanese Association for Petroleum Technology, Vol. 70, No. 6 (November 2005) pp. 522-525).

SUMMARY OF THE INVENTION

The present invention resides in that a method of produced water treatment in an in-situ recovery method of producing bitumen from oil sand, has the steps of: separating bitumen from bitumen-mixed fluid so as to leave produced water, the bitumen-mixed fluid having been recovered from the oil sand wells, and filtering the produced water via a microfiltration membrane made of polytetrafluoroethylene.

Further, the present invention resides in that a system of produced water treatment in an in-situ recovery method of producing bitumen from oil sand, has: a separator for separating bitumen from bitumen-mixed fluid so as to leave produced water, the bitumen-mixed fluid having been recovered from the oil sand wells; and a microfiltration membrane made of polytetrafluoroethylene for filtering the produced water.

Other and further features and advantages of the invention will appear more fully from the following description, appropriately referring to the accompanying drawings.

DETAILED DESCRIPTION OF THE INVENTION

As described above, hitherto, in the SAGD process or CSS process, it is an ordinary process that after oil-water separation in the oil-containing water, and subsequent softening treatment, the treated water is supplied to the once-through type boiler (the conventional flow (1)). It is required to use a feed mode in which feed-water is supplied to a drum-type boiler as the desalinated water obtained using an evaporator after oil-water separation, in consideration of more reduction in consumed water quantity, reduction in blow down quantity, reduction in consumed amount of chemicals, reduction in consumed amount of energy, $CO_2$ emission-reduction, reduction in equipment cost, and easy operation and maintenance. Further, it is earnestly desired to develop a responsible method that does not cause such troubles as raised in the conventional method (2). Further, in view of heating at near upstream of the boiler, it is desired to perform a treatment with minimal cooling of water during the preceding oil-water separation step. If these are realized, heat loss in the entire water treatment system can be drastically reduced. For example, if a sophisticated oil-water separation is actualized at high temperature of about 120° C., the heat loss is reduced, so that a great merit of using both evaporator and drum-type boiler can be obtained. Further, it is possible to design a plant capable of responding to such a wide variety of problems as described above, which leads to a great improvement in processing efficiency, economy, and environmental issue.

Recently, microfiltration membranes or ultrafiltration membranes made of ceramics have been developed, and application of those membranes has been studied. However, the ceramic membrane is generally bulky because a volume per membrane surface area is large, and also heavy, so that an installation area becomes large. Further, it is difficult to pile up membrane modules to place them. As a result, a large area is required. Besides, the ceramic membrane is weak against a mechanical and thermal impact shock, and therefore there is a possibility that the ceramics break by a wrong handling. Further, the ceramic membrane is fragile and inferior in handling. Cracks may be occurred by a strain or a rapid temperature change during operation. Further, the binder usually used in the module of ceramic membranes has less resistance to strong alkali. When a fouling trouble is occurred on the membrane surface, it is required to wash and remove the fouling matters by using a strong alkali (for example, 20% caustic soda solution). However, if strong alkali decomposes the binder, it may result in membrane disruption. Then, strong alkali may not be allowed to use for cleaning of ceramic membrane. Further, there is also a potential risk that if the ceramic membrane is frozen in a wet condition, namely such a condition that water is present inside the membrane, the ceramic membrane gets broken owing to a stress to the membrane that is loaded by the expansion of water. When the ceramic membrane is used in a cold district like in Canada, a scrupulous attention is required during both storage of ceramic membrane and period of shutdown operation. Further, the high cost of the ceramic membrane is getting obstacles to practical application.

A polytetrafluoroethylene membrane as proposed for using in the present invention enables to avoid or overcome these ceramic membrane's problems.

There is disclosed that oil-water separation can be performed by using a filtration module provided with porous multilayered hollow fibers made of polytetrafluoroethylene (see JP-A-2004-141753 ("JP-A" means unexamined published Japanese patent application), paragraph [0039]). However, there are neither working examples nor a specific description about such an oil-water separation. Besides, there is disclosed a method of performing oil-water separation by using a hollow tube made of porous materials, and utilizing a hydrophilic/hydrophobic property of the same (see JP-A-2007-185599). However, the separation of materials such as ethyl acetate, hexane and olive oil, is only disclosed. Still, there is no description about the possibility of oil-water separation of produced water after the extraction of bitumen containing heavy oil. Instead, the use of a filtration membrane made of a synthetic polymer in oil-water separation of oil-containing water has been avoided hitherto (see "Maku no Rekka to Fouling Taisaku (Degradation of Membrane and Countermeasures to Fouling)", NTS (2008), p. 88, and "Water recycling for oil sands development", Nobutoshi Shimizu and Tsuneta Nakamura, Journal of the Japanese Association for Petroleum Technology, Vol. 70, No. 6 (November 2005) pp. 522-525).

In consideration of the particular points to be solved relating to the above-described treatment of produced water (oil-water separation) in an in-situ recovery method of producing bitumen, the present invention provides an oil-water separation method, a water reuse method utilizing the same, an oil-water separation system, and a water reuse system, each method and system is to treat the produced water for enabling them, to realize sophisticated oil/water separation, and also to reduce a thermal loss, with easy operation and maintenance, without having complex multistage steps and special facilities as required in the conventional methods.

Further, the present invention provides a method of produced water treatment, a water reuse method using the same, a system of treating the produced water, and a water reuse system, each of which enables: to reduce the number of equipments and steps that are required for reuse of the produced water which is produced in the production of bitumen according to an in-situ recovery method; to downsize the entire system; and to use practically a drum type boiler equipment that has been difficult to practically use hitherto, in which those methods and systems are excellent from environmental and economical points of view.

According to the present invention, there are provided the following means:

(1) A method of water treatment in an in-situ recovery method of producing bitumen from oil sand, comprising the steps of:
separating bitumen from bitumen-mixed fluid so as to leave oil-containing water (which is called "produced water"), the bitumen-mixed fluid having been recovered from the oil sand wells; and
filtering the produced water via a microfiltration membrane made of polytetrafluoroethylene.

(2) The method of produced water treatment according to the above item (1), wherein the produced water is treated using the microfiltration membrane in the condition that the temperature of the produced water is maintained in the range of 60° C. to 200° C.

(3) The method of produced water treatment according to the above item (1) or (2), wherein the produced water is treated by filtration under internal pressure or external pressure using the microfiltration membrane having a hollow fiber structure.

(4) The method of produced water treatment according to any one of the above items (1) to (3), wherein the produced water is treated so as to send treated water having an oil concentration of 5 mg/liter or less.

(5) The method of produced water treatment according to any one of the above items (1) to (4), wherein the in-situ recovery method is a SAGD (steam assisted gravity drainage) process or a CSS (cyclic steam stimulation) process.

(6) A method of water reuse in an in-situ recovery method of producing bitumen, comprising the steps of:
distilling treated water via an evaporator, the treated water having been treated by using the microfiltration membrane in the method according to any one of the above items (1) to (5);
generating steam from the distilled water by using a drum-type boiler; and
reusing the steam for recovering bitumen from the oil sand wells.

(7) A system of produced water treatment in an in-situ recovery method of producing bitumen from oil sand, comprising:
a separator for separating bitumen from bitumen-mixed fluid so as to leave produced water, the bitumen-mixed fluid having been recovered from the oil sand wells; and
a microfiltration membrane made of polytetrafluoroethylene for filtering the produced water.

(8) The system of produced water treatment according to the above item (7), wherein the in-situ recovery method is a SAGD process or a CSS process.

(9) A system of reusing water in an in-situ recovery method of producing bitumen, including the means defined in the system according to the above item (7) or (8), further comprising:
an evaporator for distilling treated water to obtain distilled water, the treated water having been treated by the microfiltration membrane, and
a drum-type boiler for generating steam from the distilled water, the steam being capable of use for recovering bitumen from the oil sand wells.

The present invention is explained in detail below with reference to preferable embodiments of the present invention.

In the oil-water separation method of the present invention, in the in-situ recovery method to produce bitumen from oil sands, bitumen is extracted from a hot bitumen-mixed fluid recovered from the oil sand wells, and the produced water is separated from the mixed fluid, and then the resultant-separated produced water is treated through a microfiltration membrane made of polytetrafluoroethylene.

The method of producing bitumen from oil sands is classified into a surface mining method and an in-situ recovery method, and the oil-water separation method of the present invention is applied to the latter method. As the in-situ recovery method that is currently operated in practice, there are two methods, namely a SAGD process and a CSS process.

In a specific embodiment of the SAGD process, two horizontal wells are drilled at several meter intervals. A high-temperature steam is injected from the upper-level horizontal well (injection well). The injected steam rises while transmitting heat to the surrounding area, and forms a steam chamber until the rising of the steam stops owing to the top of an oil layer, and intervenient mudstones, and finally the heat-lost steam turns to condensed water. The condensed water and the bitumen having its viscosity reduced by the transmitted heat flow to the lower-level horizontal well (production well) by gravity along the interface with the higher viscosity bitumen, and they are produced as a mixed fluid. A space is formed in the oil layer as a result of the production of bitumen. Consequently, steam can be injected successively into the space. Thus, recovery of the lowered viscosity-bitumen is continued.

In one embodiment of the CSS process, the following three steps are repeated to continue the production. (1) Steam is injected to the well for a certain period of time, and then the injection of steam is stopped and the well is closed. (2) Heat of steam is transmitted to the oil sand layer, and then the oil sand layer is left for a while, to fluidize the bitumen. (3) The well is opened, and bitumen that flows into the well is pumped. These steps are repeated in one well. If only one well is used, the time period of the production of bitumen becomes intermittent. Therefore, by adjusting a timing of injection of steam and production of bitumen with respect to each group of several wells, a stabilized quantity of production can be maintained in the entire wells.

Figure 7:
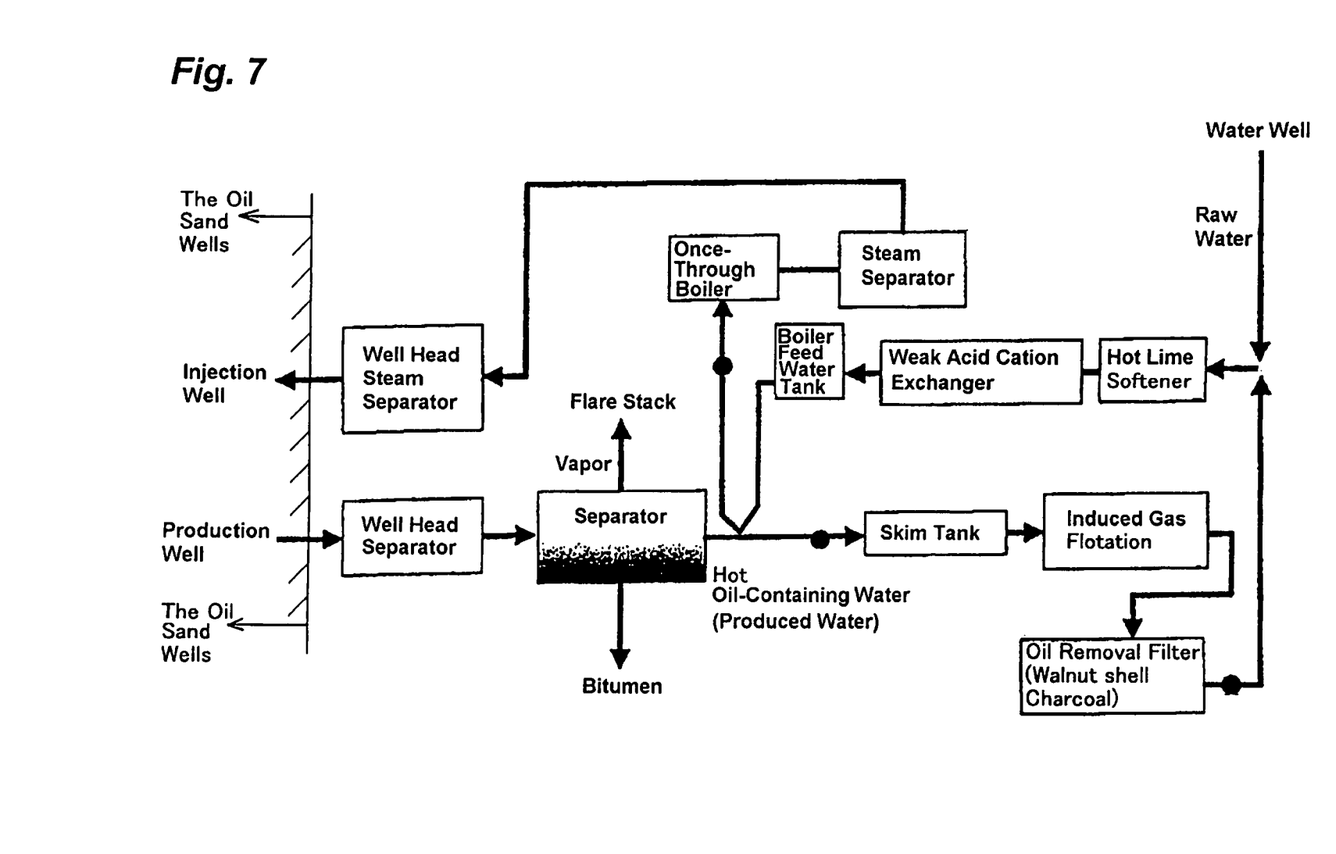
FIG. 7 is a view showing an outline of a process of reusing produced water according to the conventional flow (1) in the SAGD process.

FIG. 7 is a view showing an outline of a process of reusing oil-containing water according to the conventional flow (1) in the SAGD process. In the SAGD process, a high-temperature and high-pressure steam is injected to the oil sand layer in the earth as described above, so that fluidity of the bitumen in the oil sand layer is enhanced, to recover the bitumen in the earth together with the high temperature condensed water. Firstly, sands, heavy metals, and the like are contained in the hot mixed fluid containing the thus-recovered bitumen. The hot bitumen-mixed fluid is depressurized and then placed in a separator. The temperature of the hot bitumen-mixed fluid is not particularly limited, but preferably the temperature is in the range of 85° C. to 135° C., more preferably the temperature is in the range of 90° C. to 120° C. By the separator, the hot bitumen-mixed fluid is separated into bitumen, the produced water (hot oil-containing water), and an evaporative emission gas. The thus-separated produced water is oil-contaminated water that contains a substantial amount of oil. Before cooling, the oil-containing water has been heated up to about 117° C. (in the present invention, the term "hot (or heated up)" means that the temperature is elevated higher than the ambient temperature: for example, if the ambient temperature is about 20° C., the temperature is elevated higher than this about 20° C.). After cooling of the produced water by means of a heat exchanger, oil is removed from the produced water, by using a skim tank, an IGF (induced gas floatation), and an oil removal filter (for example, walnut shell). The resultant deoiled produced water, to which raw fresh water pumped from a water well is added, is reused as a BFW (boiler feed water) via a hot or warm lime softening and a WAC (weak acid cation exchanger).

Details of each of steps (areas) in the SAGD process according to the conventional flow (1) are as follows.

Well Pad Area

The high-pressure steam is distributed to each injection well from its header via a flow-control valve. On the other hand, in the production well, production is performed under the flow control so that steam does not break through from the injection well. Both vapor and liquid of the produced fluid from a well head separator is collected to a header, and then delivered to the oil-water separation area. An emulsification-preventing chemical is added to the liquid header.

Oil-Water Separation Area

The produced mixed fluid enters into an oil separator (FWKO), and is separated into three phases of vapor (hydrocarbon, moisture, some amount of hydrogen sulfide), bitumen, and produced water. The bitumen is delivered to a treater, and dehydrated to a degree of 0.5% water content by weight. Thereafter, the bitumen is cooled with an oil cooler and then stored.

Oil Removal Area

The produced water obtained from the oil-water separation area still contains the oil of 1,000 ppm, or more. The oil removal area is basically composed of a skim tank, induced gas floatation (IGF), and an oil removal filter (for example, walnut shell). The oil is removed via these equipments.

Water-Softening Area

In this area, the in-plant water that is mainly composed of deoiled produced water is subjected to a treatment for reusing the treated water as the BFW (boiler feed water). Main equipment in this area are a hot or warm lime softener, an after filter, and a weak acid cation exchanger (WAC). In the lime softener, hardness and silica are reduced. Turbidity in the lime softener treated water is removed via the after filter (pressure filter filled with anthracite). A trace of remaining calcium and magnesium ion is completely removed with the WAC. Make-up water is supplied from water well.

Steam Production Area

The BFW treated by the WAC is pumped up to the steam generator after heat recovery. In the steam generator, a natural gas is used as a fuel. Herein, a 75 to 80% quality-steam (namely, gas phase of 75 to 80 wt % and liquid phase of 20 to 25 wt %) is produced. It is fed to a high pressure steam separator and the liquid is separated. The high pressure steam is delivered to the well pad area, and injected to the well. The separated liquid is flashed by depressurization and produces a low pressure steam and it is distributed to other areas. The blow down water formed by the depressurization is cooled and disposed to a disposal well.

In the conventional SAGD process, the OTSG (Once-Through Steam Generator) is usually used as a steam generator. The reason why the OTSG is used is that the OTSG is operable even though a boiler feed water contains high TDS (allowable to about 20,000 ppm, while designed to 8,000 ppm). When a drum-type boiler is used, a high-quality boiler feed water is required, and therefore, for example, an evaporator is necessary for producing boiler feed water instead of a conventional system of a lime softener, an after-filter and a WAC.

Figure 1:
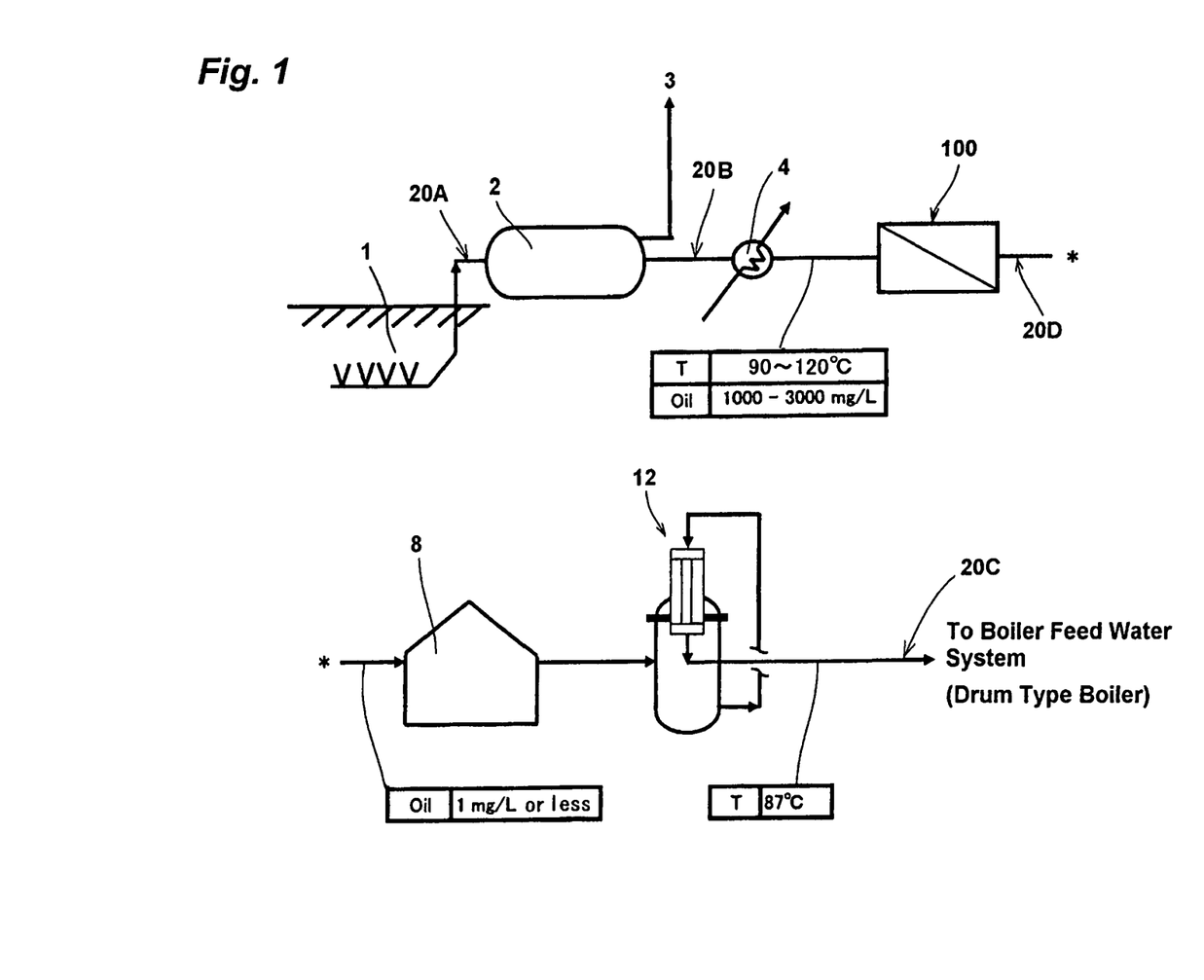
FIG. 1 is a flow diagram schematically showing each of steps involved in reuse of water obtained by treating, with both an evaporator and a drum type boiler, a produced water that is obtained in production of bitumen according to one embodiment of the oil-water separation method of the present invention.

FIG. 1 is a flow view schematically showing each of the steps involved in a method of reusing the produced water obtained in the production of bitumen according to one embodiment of oil-water separation according to the present invention. In the water treatment system of the embodiment, bitumen mixed fluid 20A is recovered from the oil sand layer 1 via a production well, and treated with a separator 2 to remove bitumen 3. Thereafter, the produced water 20B separated from the bitumen is cooled to a predetermined temperature with a heat exchanger 4. The above-described steps are the same as the flows (1) and (2) of the conventional method (see FIGS. 8 and 9). In the flow of the embodiment of the present invention, the produced water 20B, in which the high temperature condition is maintained at 90° C. to 120° C., is delivered to oil-water separation unit 100. The temperature of the produced water is not particularly limited, but preferably the temperature is in the range of 85° C. to 135° C., more preferably the temperature is in the range of 90° C. to 120° C.

A preferable embodiment of the oil-water separation unit is explained in detail below with reference to FIGS. 4 and 5. The oil-containing water generally contains the oil of 1,000 mg/L to 3,000 mg/L. However, it is usually necessary to reduce the content to the range of 10 mg/L or less, and further reduction to 5 mg/L or less is preferable. However, according to the conventional separation method, even though it is a multi-stage oil removal process, the oil content of the treated water sometimes exceeds 10 mg/L (see "High efficiency de-oiling for improved produced water quality", M. K. Bride, IWC-06-15). The embodiment of the present invention uses a PTFE microfiltration membrane module having preferable characteristics such as both heat resistance and filtration performance. Thereby, the oil can be reduced to 5 mg/L or less from one step in a simple process. Further, it is also possible to reduce the oil to 1 mg/L or less, depending on conditions of the oils such as the particle size distribution in the produced water and, further, to 0.1 mg/L or less under more preferable conditions.

The embodiment of the present invention uses a microfiltration membrane made of polytetrafluoroethylene (MF membrane) that is excellent in heat resistance. Therefore, cooling by using the heat exchanger 4 is not required from a material preventing point of view, and then, if necessary, without cooling, the produced water can be fed to the membrane separation unit directly. In consideration of evaporator operation at the subsequent stage, it is preferable to reduce a heat loss, for example, an oil-water separation unit 100 to be operated at a temperature of 60° C. to 200° C., more preferably from 85° C. to 135° C., and furthermore preferably 90° C. to 120° C. In the area where energy consumption is increased by heating, especially in such a cold district as Canada, it is especially important to reduce a heat loss as mentioned above. Therefore, a reduction of heat loss is a great advantage of the embodiment of the present invention.

In the flow of the embodiment, treated water 20D extracted from the oil-water separation unit 100 is fed to an evaporator 12 via the deoiled tank 8. Namely, it is not necessary to conduct a circuitous treatment via many steps such as the skim tank 5, the induced gas floatation 6, and the oil removal filter 7 as in the conventional flows (1) and (2). Further, smaller sizes of oil droplets will be removed by the membrane method compared with the conventional method and the treated water 20D to be fed to the evaporator will contain less oil. It means that the organic matters which cause scaling in the evaporator have been suitably removed. Accordingly, even though a treatment is performed continuously, it is not necessary to clean the evaporator frequently. Thereby, the operation efficiency can be remarkably increased. In the present invention, the term "scaling" is used to mean scale forming that is caused by carbides originating from organic matters and hardness such as calcium, magnesium, silica, etc.

As one of the great advantages of the embodiment, it is emphasized that a drum type boiler can be used. Previously, an extremely high specialty once-through boiler has been applied by using reused water (boiler feed water) to form a high-pressure and high-temperature steam that is introduced into an injection well for the production of bitumen. The use of a drum type boiler makes the once-through boiler unnecessary, thereby considerably increasing the cost competitiveness involved in the production of bitumen. In other words, by the use of the particular oil-water separation means described above in the embodiment, it is possible to use the evaporator practically. As a result, the produced water is synergistically purified by using both means (i.e., oil-water separation plus evaporation) as mentioned above, and thereby extremely purified distilled water can be used as a boiler feed water 20C.

In the present invention, the water reuse treatment flow is not limited to the embodiment flow as described above, but for example, the thus-extracted treated water 20D may be treated via the same equipment as in the conventional flow (1) (see FIG. 8). Herein, with respect to various kinds of installations and equipment for use in the present invention, ordinarily used facilities in this technical field may be used. For example, the facilities may be constructed with reference to the descriptions of "Development of Canada oilsands—Future challenges", Kiyoshi Ogino, Journal of the Japanese Association for Petroleum Technology, Vol. 69, No. 6 (November 2004) pp. 612-620, "Water recycling for oil sands development", Nobutoshi Shimizu and Tsuneta Nakamura, Journal of the Japanese Association for Petroleum Technology, Vol. 70, No. 6 (November 2005) pp. 522-525, and "TORR™ — The Next Generation of Hydrocarbon Extraction From Water", M. J. Plebon, Journal of Canadian Petroleum Technology, Vol. 43, No. 9 (September 2004) pp. 1-4. Specifically, the following equipment are available and applicable to the present invention: separators manufactured by NATOCO, and KVAERNER, evaporators manufactured by GE, and AQUATECH, once-through type boilers manufactured by TIW, and ATS, drum type boilers manufactured by B&W, and C. B. NEBRASKA BOILER.

Figure 2A:
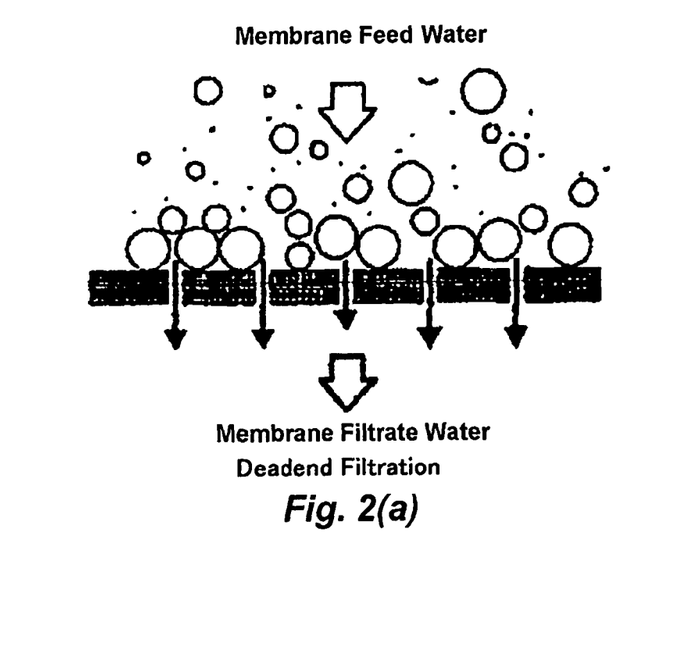
FIG. 2(a) is a schematically view for explaining a dead-end filtration.
Figure 2B:
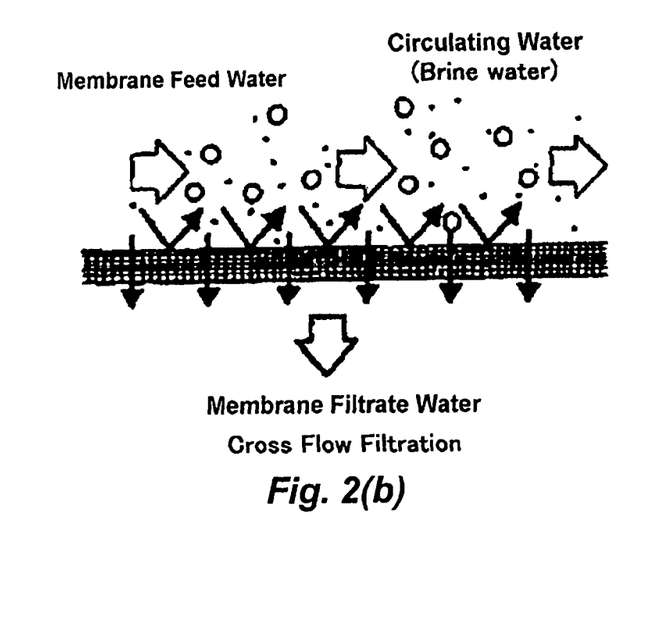
FIG. 2(b) is a schematically view for explaining a cross-flow filtration.

In the oil-water separation method of the embodiment, the filter system for oil-water separation may be a dead-end flow filter system, or a cross-flow filter system. However, the cross-flow filter system is preferable (see FIG. 2).

The dead-end flow filtration is a system in which the total membrane feed water is filtrated without circulating the membrane feed water. The cross-flow filter is a system of running a membrane feed water along the surface of the membrane so that the membrane-permeate water and the membrane feed water flows at right angles to each other. Previously, the cross-flow filter system has been used to reduce a polarization phenomenon (the polarization means that the density of the dissolved material increases on the surface of the membrane). With respect to suspended matters, a phenomenon similar to the polarization also occurs. In the dead-end flow filtration, all suspended matters accumulate on the surface of the membrane. On the contrary, even though suspended matters accumulate on the surface of the membrane in the cross-flow filter system, deposits on the surface of the membrane are detached and removed by a flow of the circulating water. Therefore, accumulation of the deposits on the surface of the membrane and a hollow occlusion (block) tend to be inhibited. However, the cross-flow filter system needs more energy for circulating the water, compared to the dead-end flow filter system. Therefore, the dead-end flow filter system is advantageous in terms of energy consumption.

As the filtration membrane, there are mentioned a MF (microfiltration) membrane, a UF (ultrafiltration) membrane, a NF (nanofiltration) membrane and a RO (reverse osmosis) membrane. In the oil-water separation in the present invention, the MF membrane can be preferably used. Ordinarily, the MF membrane has an average pore size of 0.01 μm to 10 μm. Fine particles having a larger size than the above-described average pore size can be filtrated with the membrane, through which a soluble fraction permeates. As the MF membrane, use can be preferably made of a MF membrane especially having a micro pore size range of about 0.01 μm to about 0.45 μm in the present invention. Ordinarily, water-insoluble oil in the waste water is present in fine oil droplets or an emulsion formed by the assistance of a surfactant. A membrane having such a micro pore size range coagulates oil droplets on the surface of the fiber assembly forming such micro pores, and the resultant oil droplet aggregates are captured by the micro pores, and then removed from the membrane in the same manner as solid particles. On the other hand, suspended solids flowing from gaps between captured oil droplet aggregates are removed by filtration at the same time. The thus-filtrated water permeates through the membrane. Thus, clean water is obtained.

The UF membrane has smaller openings than those of the MF membrane. Specifically, the pore size of the UF membrane is less than 0.01 μm. The UF membrane has such a fine pore size that an object to be removed is organic materials existing in solution, for example, those having a molecular weight of about 1,000 to about 300,000. Further, with respect to the RO membrane and the NF membrane, no pore is opened therein, but their molecular structure is determined so that the interval between polymer molecules forming the material of the membrane is a suitable size. Thereby they are designed so that smaller low molecular materials or ions existing in solution can be captured by the intervals. In short, filtration with these membranes is a separation method of using the movement of water by osmotic pressure from the reverse side. A difference between these membranes is as follows. In the NF membrane, the object to be removed ranges from divalent metal ions, such as hardness, to a variety of low molecular materials. The NF membrane is ranked as the intermediate level between the UF membrane and the RO membrane. However, there is no clear definition of the NF membrane. On the other hand, the RO membrane is used for objects to be removed, such as cations (for example, calcium and sodium), anions (for example, chloride ion and sulfate ion), and low molecular organic compounds (for example, agricultural chemicals).

It is possible to capture oil with the UF membrane or the RO membrane. However, the size of the interval between polymer molecules of these membranes is so small that oil droplet aggregates thoroughly block a water-penetrating pathway. Resultantly, the water permeate capacity of the membrane is instantly reduced. Generally, the OF membrane and the RO membrane are produced by a polymer of a low melting point and some materials polymer which is easily soluble in an organic solvent as a base material. Therefore, they are inferior in heat resistance and oil resistance. They are also low in intensity. The PTFE MF membrane is the most suitable for use under such a severe condition as a treatment of oil-containing water including bitumen at a high temperature. For more information on these filtration membranes, reference can be made to "Jyosuimaku (Water-purifying membrane) (Second Edition)" edited by Makubunri Gijutsu Shinkokyoukai—Makujyosui Iinkai, published by Gihodo (2008), pp. 78-79.

For oil-water separation of the embodiment, it is preferable to use a hollow fiber membrane. Generally, the cross-flow filter system is used for the internal pressure process, while both dead-end flow filter systems and cross-flow filter systems are used for the external pressure process. However, it depends on the size and nature (properties) of the suspended materials (turbidity) to select anyone of these systems.

Figure 3A:
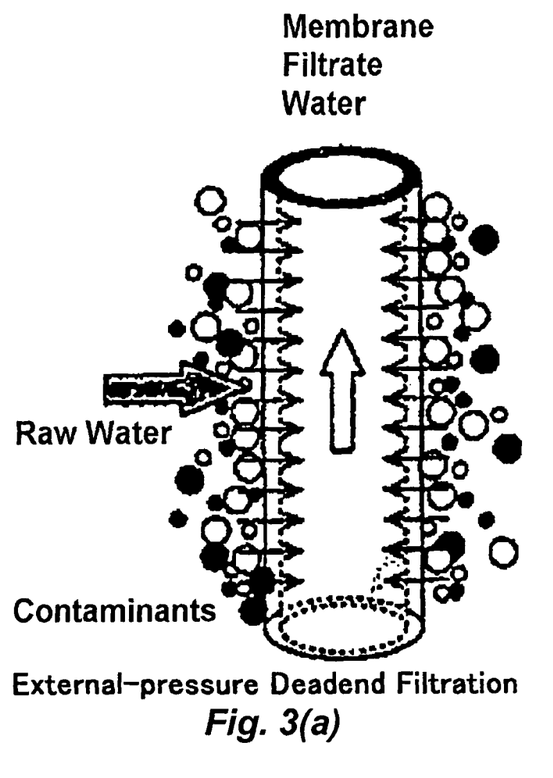
FIG. 3(a) is a schematically view for explaining an external pressure dead-end filtration.
Figure 3B:
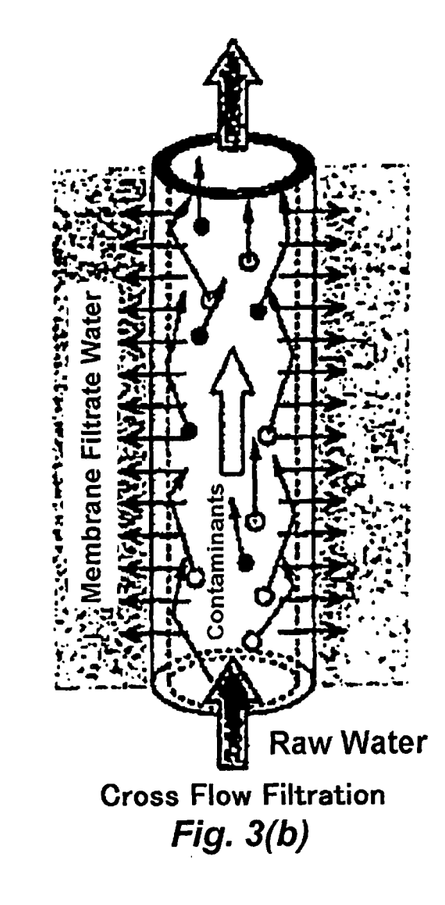
FIG. 3(b) is a schematically view for explaining an internal pressure cross-flow filtration.

In the embodiment, it is preferable to use an internal pressure cross-flow filter (see FIG. 3(b)). When filtration is performed by using a cylindrical filter such as a hollow fiber membrane and tubular membrane, the system in which a raw waste water is run inside the cylinder, and then a filtrate is discharged outside the cylinder is called an internal pressure filter system. Of the internal pressure filter system, both depositions of material accumulated on a membrane surface and membrane occlusion, are prevented by keeping a higher velocity on the membrane surface to have a circulating flow with a pump, where a part of the raw waste water is not filtrated, namely by an exfoliation effect of the accumulated materials owing to the action of the waste water itself. On the other hand, a filter system in which the total amount of raw waste water is poured into the surface of a filter to filtrate the raw waste water is called a dead-end flow filtration. In the present case, the cross-flow filtration is preferable in order to prevent from membrane occlusion owing to a lot of oil and suspended materials present in the waste water. In contrast, the filter system in which a waste water is run from outside the membrane and a filtrate is discharged inside the membrane in the opposite direction to the above-described system is called an external pressure filtration (see FIG. 3(a)). In the external pressure filter system, when accumulated materials are also attached to the membrane surface, a cross-flow filter system may be used. However, in this system, a linear velocity on the membrane surface becomes slow on account that a cross-sectional area of the membrane in the flow path at the time of circulation is larger than that of the case where the waste water is run inside the membrane. Consequently, an exfoliation effect of the accumulated materials becomes low. Therefore, with respect to the external pressure filter system, the selection of a cross-flow filter system or dead-end flow system should depend on the content of oil and suspended materials. For more information on the above-described filter systems, "Jyosuimaku (Water-purifying membrane) (Second Edition)" edited by Makubunri Gijutsu Shinkokyoukai—Makujyosui Iinkai, published by Gihodo (2008), pp. 78-79, can be referred to (the attached FIGS. 2 and 3 have been cited from the literature).

Figure 4:
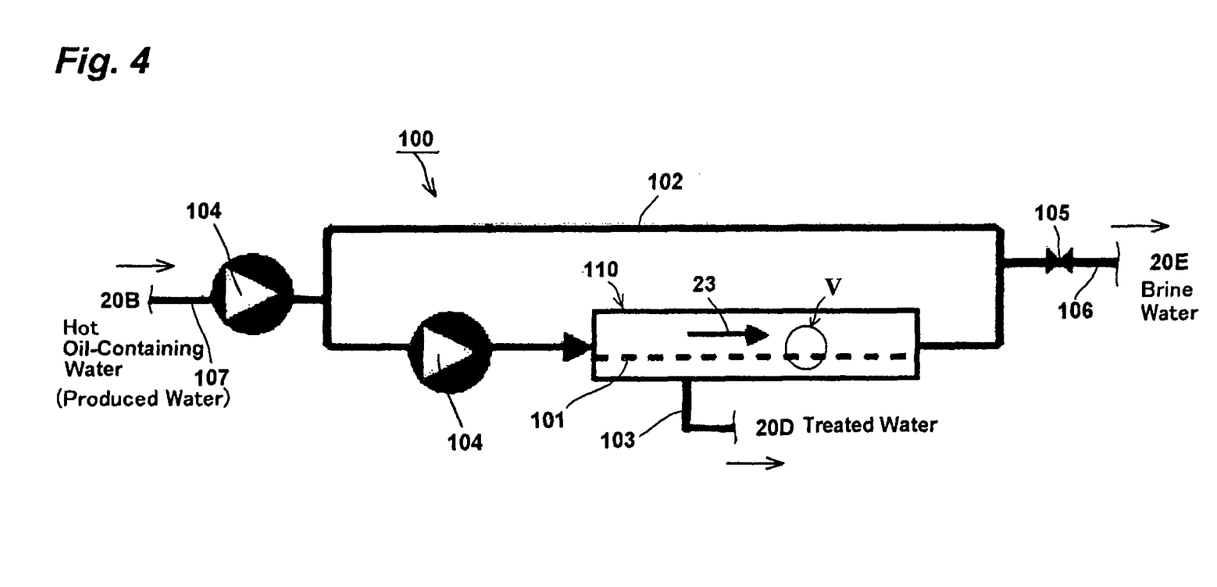
FIG. 4 is an illustration diagram schematically showing a preferable embodiment of the oil-water separation unit according to circulating flow filtration in which a cross-flow system and an external pressure filtration are used in combination, which is used in the method of oil-water separation of the present invention.
Figure 5:
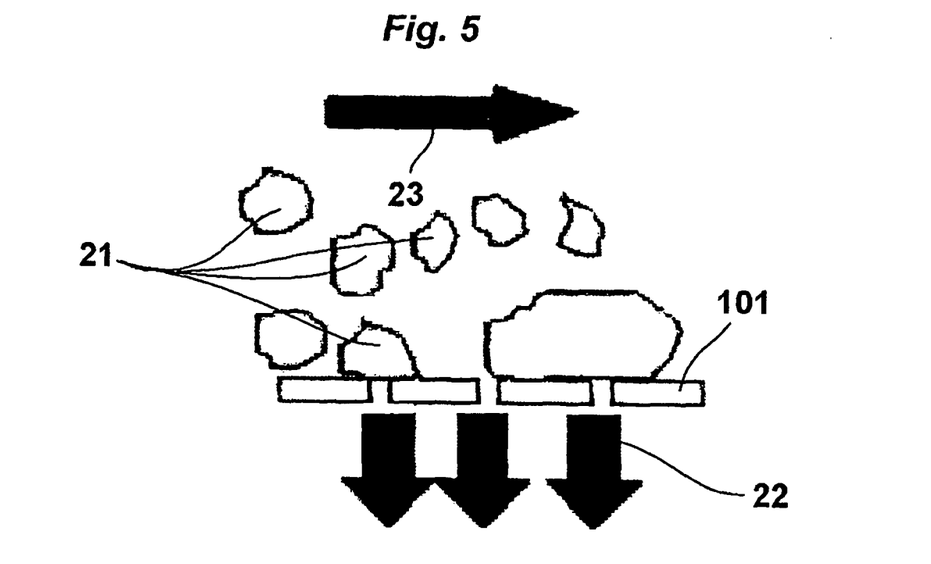
FIG. 5 is an illustration diagram schematically showing the condition of oil-water separation by enlarging the region V shown in FIG. 4.

FIG. 4 is an illustration diagram showing a preferable embodiment of the oil-water separation unit according to circulating flow filtration in which a cross-flow system and an external pressure filtration are used in combination, which is used in the oil-water separation according to the present invention. FIG. 5 is an illustration diagram showing the condition of oil-water separation by enlarging the region V shown in FIG. 4. In the present embodiment, oil-containing water 20B is introduced from a feed flow line 107 to a circulating flow line 102 via a check valve 104. It is preferable that the flow rate in the circulating flow line 102 is set from 4 to 5 times as fast as the feed flow rate, and the oil-containing water is fed to the membrane toward the direction 23. On the way of the circulating flow line 102, a check valve 104 and a separation membrane module 110 are arranged. As a whole, the oil-water separation unit 100 is composed of these components.

Filtration is performed by a cross-flow filter system using a separation membrane (MF membrane) in the separation module. Consequently, treated water 20D from the filtration direction 22 (see FIG. 5) can be recovered from a product line 103 having a flux of 30 to 200 L/m2 hr. In the present embodiment, Oil 21 can be sufficiently dammed with a membrane 101, so that the oil in the treated water 20D can be reduced to an extremely low level. The treated water 20D can be recovered at the same flow rate as the flow rate at the feed line 107. On the other hand, a brine water 20E containing a more rich oil is discharged from the circulating flow line 102 to a discharge flow line 106 via a valve 105. The discharge flow rate can be reduced to, for example, about one per hundred as much as the feed flow rate. Herein, the above-described flow rate is shown as an example, and may be suitably adjusted in accordance with the property of the oil-containing water.

Figure 6:
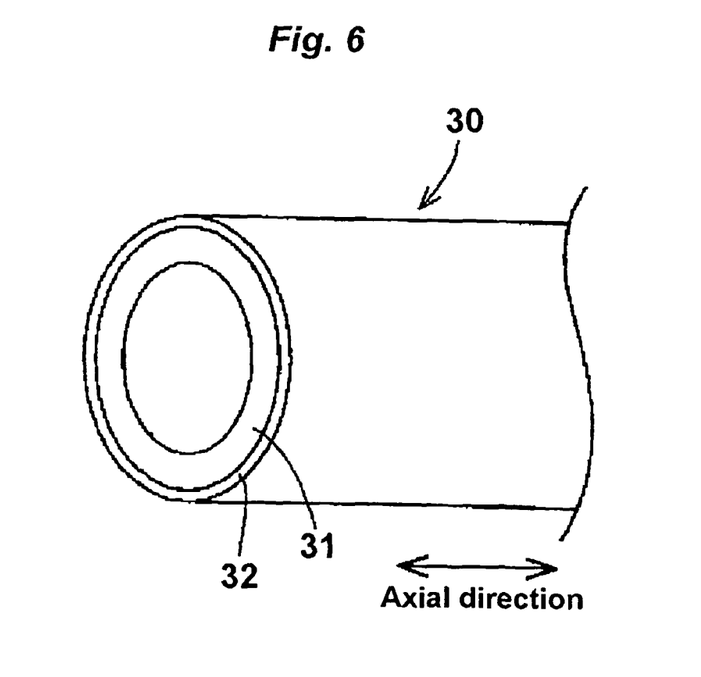
FIG. 6 is a perspective view schematically showing an example of a hollow fiber membrane that can be preferably used in the method of oil-water separation of the present invention.

In the oil-water separation system of the present invention, a microfiltration membrane (MF membrane) made of polytetrafluoroethylene (PTFE) is used. The form of the filtration membrane is not particularly limited, and for example, may be a module that is composed of a material having a hollow fiber membrane structure. Specifically, it is preferable to use a membrane that is designed so as to have an outside diameter of 1 mm to 5 mm, an inside diameter of 0.5 mm to 4 mm, and a porosity of 40% to 90%, and further has a continuous microstructure having a pore size of 0.01 μm to 0.45 μm. It is further preferable to use the following composite hollow fiber membrane designed to enhance the flux. For example, when the membrane is used for internal pressure cross-flow filtration, it is preferable to use a membrane that is composed of two PTFE-made composite membranes which have a filter layer having a pore size of 0.01 μm to 0.45 μm inside thereof, and a supporting layer having a pore size of 0.45 μm to 2 μm outside thereof. On the other hand, when the membrane is used for the external pressure dead-end flow filtration, or the external pressure cross-flow filtration, it is preferable to use a membrane that is composed of two PTFE-made composite membranes which have a filter layer having a pore size of 0.01 μm to 0.45 μm outside thereof, and a supporting layer having a pore size of 0.45 μm to 2 μm inside thereof (see FIG. 6). In FIG. 6, 30 represents a tube composed of double layers, 31 represents a support layer, and 32 represents a filtration layer. These membranes are functionally specialized so that the pore size of the filtering area necessary for filtration is reduced in only one membrane, while the other membrane has a mechanical strength (intensity) necessary for a support, and also has a large pore size in order to reduce filtration resistance. For more information on the above-described filters, for example, JP-A-2004-141753, JP-A-4-354521, and JP-A-3-109927 can be referred to.

These PTFE-made membranes ordinarily have a hydrophobic property, namely water repellency. Therefore, it is ordinary that before feeding the waste water, the membrane is in advance moistened with a hydrophilic organic solvent such as isopropyl alcohol, or a surfactant, and then the waste water is fed before these solutions dehydrate. It is possible to enhance the hydrophilic property of the surface of a membrane fiber by fixing a hydrophilic polymer having an excellent chemical resistance in accordance with necessity to micro-fibrils by which a PTFE membrane is composed. This method is preferably applied to the present invention. As a method of enhancing the hydrophilic property of the PTFE porous membrane, for example, it is possible to use a method of insolubilizing, for example, polyvinyl alcohol having a relatively excellent chemical resistance by impregnating an aqueous solution of the polyvinyl alcohol inside a pore of the membrane, and then by crosslinking with a dialdehyde in the presence of an acid catalyst, or by crosslinking with a proper crosslinking agent and UV treatment. These methods are able to provide a chemically stable hydrophilic property. Further, these cross-linked hydrophilic polymers have a resistance to the high operating temperatures in the present invention, and also have such a lot of advantages that even though once the polymer dehydrates, the polymer is quickly moistened directly with the waste water, which results in a quick start-up of the filtration. Any one of these methods may be used in the present invention.

When a membrane process is used in the field of water treatment, it is ordinary that a periodical backwashing and chemical cleaning are performed in order to keep a stable flux for a long time. In the case of the PTFE filtration membrane used in the present invention, firstly with respect to the backwashing in the filtration, a backwash is performed for about 10 seconds every 10 to 60 minutes with clear water. The supply pressure of the backwashing water is in the range of about 100 Kpa to about 300 Kpa. Secondly, with respect to the chemical cleaning, a circulation is performed with a 1 to 20% sodium hydroxide aqueous solution for 2 to 6 hours. The chemical cleaning is performed at a monthly to half-yearly frequency in accordance with the degree of contamination of the membrane surface. According to these operations, the flux can be stably maintained for a long period. Further, in some occasion, it is also possible to perform a chemical cleaning with sodium hypochlorite, or an organic solvent.

As described above, the PTFE filtration membrane used in the present invention has a high resistance to heat, and also has a resistance to hydrocarbons including aromatic oils, and further has a high chemical resistance, so that when the membrane is contaminated, the membrane can be cleaned by using highly concentrated chemicals. Therefore, the PTFE filtration membrane has preferable characteristics for application to the oil-water separation. Even though the oil content in the feed waste water is as high as 2,000 mg/L, it is possible for PTFE membrane to perform a continuous operation stably.

As described in the above "Summary of the invention" section with respect to "Water recycling for oil sands development", Nobutoshi Shimizu and Tsuneta Nakamura, Journal of the Japanese Association for Petroleum Technology, Vol. 70, No. 6 (November 2005) pp. 522-525, it is typical that when oil-water separation is conducted, the use of a separation membrane rather has been avoided. For example, when a separation membrane made of PVDF (poly(vinylidene fluoride)) is used, the maximum permissible value of a mineral oil contained in the influent is 3 mg/L or less that is generally considered as a standard (see "Maku no Rekka to Fouling Taisaku (Degradation of Membrane and Countermeasures to Fouling)", NTS (2008), p. 232. Further, any one of the membranes made of PVDF, PE, PP, acrylonitrile, or cellulose acetate have so low a resistance to heat that they are ordinarily intolerable to a treatment of produced water without cooling to ambient temperature. In these membranes, the oil adheres to the surface of the membrane, and the adhered oil itself has a harmful chemical effect on the membrane material, and also blocks the permeation of water through the membrane, which results in a factor that causes fouling and scaling (see "Maku no Rekka to Fouling Taisaku (Degradation of Membrane and Countermeasures to Fouling)", NTS (2008), p. 88.

From these points of view, the PTFE-made hollow fiber membrane POREFLON (trade name, manufactured by SUMITOMO ELECTRIC FINE POLYMER INC.) is preferably used in particular. Examples of the hollow fiber membrane include a submerged type-membrane, external pressure dead-end flow filtration membrane, and internal pressure cross-flow filtration membrane. Of these membranes, the internal pressure cross-flow filtration membrane is preferable. The dimensions of the hollow fiber membrane are properly selected in accordance with the quantity of the oil-containing water to be treated and the oil content. For example, use can be made of membranes having a pore size of 0.01 μm to 0.45 μm, an inside diameter of 0.5 mm to 1.5 mm, an outside diameter of 1 mm to 5 mm, a membrane surface area of 2 $m^2$ to 25 $m^2$, a module length of 1,000 mm to 2,500 mm, and a module diameter of 100 mm to 300 mm. The filtration pressure may be properly adjusted. However, for example, in the case of internal pressure cross-flow filtration, it is preferable that the maximum value of a pressure drop (namely, pressure at the side of raw waste water-pressure at the side of permeate) is in the range of 30 kPa to 200 kPa. If the pressure drop is lower than 30 kPa, it is difficult to attain a sufficient flux. On the other hand, if the pressure drop is more than 200 kPa, the pressure of the oil onto the surface of membrane becomes stronger. Thereby, contamination gets worse owing to penetration of oil inside the membrane, which results in a reduction of flux. Besides, considering the exfoliation effect, it is preferable that the filtration is performed by setting the linear velocity within the range of 0.2 m/sec to 3 m/sec. If the linear velocity is set at less than 0.2 m/sec, the exfoliation effect becomes smaller. If the linear velocity is set at more than 3 m/sec, the large-size pump is needed, thereby increasing power consumption. As a result, a treatment cost increases.

Similarly, in the case of both external pressure dead-end type and external pressure cross-flow type, the dimensions of the hollow fiber membrane are properly selected in accordance with the quantity of the oil-containing water to be treated and the oil content. For example, use can be made of membranes having such dimensions as a pore size of 0.01 μm to 0.45 μm, an outside diameter of 1.0 mm to 3.0 mm, an inside diameter of 0.5 mm to 1.5 mm, a membrane surface area of 25 $m^2$ to 100 $m^2$, an module length of 1,000 mm to 2,500 mm, and a module diameter of 100 mm to 300 mm. The filtration pressure may be properly adjusted. However, for example, in the case of external pressure filtration, it is preferable based on the same reasons as described above that the maximum value of a pressure drop (namely, pressure at the side of raw waste water-pressure at the side of permeate) is in the range of 20 kPa to 200 kPa, though the pressure drop may be changed depending on the pore size. Further, the faster the linear velocity in the above pressure range the better. However, in consideration of power consumption, it is preferable that filtration is performed by setting the linear velocity within the range of 0.1 m/sec to 0.2 m/sec. On the other hand, in the case of a submerged type-membrane, the dimensions of the hollow fiber membrane are properly selected in accordance with the quantity of the oil-containing water to be treated and oil content. For example, use can be made of membranes having a pore size of 0.01 μm to 0.45 μm, an inside diameter of 0.5 mm to 1.5 mm, a membrane surface area of 5 $m^2$ to 50 $m^2$, a module length of 1,000 mm to 2,500 mm, and a module diameter of 100 mm to 300 mm. The filtration pressure may be properly adjusted. However, it is preferable that the maximum value of a pressure drop (namely, pressure at the side of raw waste water-pressure at the side of permeate) is in the range of 5 kPa to 95 kPa.

Further, in the case of submerged type-membrane, it is preferable that filtration is performed by a method including the steps of generating a spiral flow near the surface of the membrane owing to aeration ordinarily from the lower side of membrane, and setting the linear velocity owing to the spiral flow within the above-described pressure range so as to be in the same range of 0.1 m/sec to 0.2 m/sec as that of the external pressure filtration.

According to the methods and systems of the present invention, when performing oil-water separation of a produced water that is produced in the production of bitumen according to an in-situ recovery method, it is possible to achieve such excellent advantageous effects that it is possible to realize a sophisticated oil-water separation of the produced water and reduce heat loss, without relying on a number of multi-stage troublesome steps and particular equipment that have been required, and with an easy operation and maintenance.

Further, according to the methods and systems of the present invention, it is possible to reduce the number of equipment and steps that have been required for reuse of the produced water that is produced in the production of bitumen according to the in-situ recovery method, thereby downsizing the entire system, practically using a drum type boiler that has been difficult to use hitherto, and realizing oil-water separation and water reuse treatment that are excellent from environmental and economical points of view.

Though a part is already described in detail, advantages that are provided by the above-described preferable embodiments of the present invention are summarized below.

(1) Equipment cost can be saved by the reduction in the number of oil-removal equipment. The facilities are also made compact, which results in a small-sized building covering them, thereby reducing the investment cost. Further, an easy operation and maintenance is realized.

(2) An emulsion breaker of chemicals to be injected before the knock-out drum can be omitted or reduced to the degree that omission or reduction has no adverse influence on separation.

(3) High efficiency oil-water separation can be performed. The oil can be reduced to 5 mg/L or less.

(4) Organic scale trouble in a heat exchanger or a boiler can be reduced by a high efficiency oil removal.

(5) When an evaporator is set at a subsequent stage, scale trouble in the evaporator can be considerably reduced.

(6) A once-through boiler was only used in a conventional method. However, when a desalination unit such as an evaporator is used, an industrial boiler becomes operational in the present invention. As a result, an investment cost can be drastically reduced.

(7) When the drum-type boiler is used, the quantity of blow down can be reduced to a range of 1 to 5 wt % from the conventional range of 20 to 30 wt %. Thereby, the thermal efficiency can be increased, and energy consumption can be reduced. Further, the consumption of water and discharge amount of waste water can be also reduced.

(8) As a membrane module made of polytetrafluoroethylene (PTFE), it is possible to operate at an operating temperature of, for example, up to 200° C. Therefore, in the case of the installation of the evaporator, it is possible to omit a heat exchanger that is necessary for a conventional system and that is installed at the inlet of a skim tank. Consequently, heat loss can be drastically reduced.

(9) It is possible to overcome many problems of the ceramic membrane such as cracking issues under the condition of a rapid temperature change; alkali resistance related to a chemical cleaning; unhandiness and cost issue owing to the problems of fragility, weight, size, flexibility, freezing, etc.

(10) In the production of bitumen from oil sands, especially in the in-situ recovery method (SAGD process, CSS process) that is expected to be of increasing its importance in future, the present invention drastically reduces both the economic and environmental loads of the production, thereby enhancing the competitiveness to the conventional crude oil production, and further increasing the feasibility of it.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2009-101765 filed in Japan on Apr. 20, 2009, which is entirely herein incorporated by reference.

What we claim is:

1. A method of conducting water treatment of water produced from an in-situ recovery of bitumen from oil sand, comprising the steps of:
    subjecting a bitumen-mixed fluid to separation in a separator to obtain bitumen and a hot oil-containing water, the bitumen-mixed fluid being produced from an oil sand well; and
    filtering the hot oil-containing water at a temperature of from 85-135° C. with a microfiltration membrane made of polytetrafluoroethylene to produce a product water having a lowered oil content
    wherein the hot oil-containing water is filtered under an external or internal pressure with the microfiltration membrane having a hollow fiber structure, the microfiltration membrane has an outer diameter of 1-5 mm, an inner diameter of 0.5-4 mm, a porosity of 40-90% and continuous structures having a pore size of 0.01-0.45 μm and the microfiltration member is contained in a cross-flow filter system.

2. The method of produced water treatment as claimed in claim 1, wherein the hot oil-containing water is filtered to produce product water having an oil concentration of 5 mg/liter or less.

3. The method of produced water treatment as claimed in claim 2, wherein the product water has an oil concentration of no more than 0.1 mg/L.

4. The method of claim 3, consisting of the separation and filtering steps.

5. The method of produced water treatment as claimed in claim 1, wherein the in-situ recovery method is a SAGD process or a CSS process.

6. The method of claim 1, wherein the oil content of the hot oil-containing water is from 1,000-3,000 mg/L.

7. The method of claim 1, wherein the oil content of the product water is no more than 10 mg/L.

8. The method of claim 1, wherein the hot oil-containing water is at a temperature of from 90-120° C. during filtering.

9. The method of claim 1, wherein the microfiltration membrane has hydrophilic properties.

10. A method of water reuse in an in-situ recovery method of producing bitumen, comprising the steps of:
    treating an oil-containing water according to the method of claim 1 to obtain treated water;
    distilling the treated water via an evaporator;
    generating steam from the distilled water by using a drum-type boiler; and reusing the steam for recovering bitumen from the oil sand wells.

11. A system for conducting water treatment of water produced from an in-situ recovery of bitumen from oil sand, comprising:

a separator for subjecting a bitumen-mixed fluid to separation comprising an inlet for receiving a bitumen-mixed fluid, an outlet for discharging bitumen, and an outlet for discharging an oil-containing water; and a microfiltration membrane contained in a cross-flow filter system and made of polytetrafluoroethylene, having a hollow fiber structure, an outer diameter of 1-5 mm, an inner diameter of 0.5-4 mm, a porosity of 40-90% and continuous structures having a pore size of 0.01-0.45 μm for filtering the hot oil-containing water at a temperature of from 85-135° C. under an external or internal pressure, the membrane comprising an inlet for receiving the oil-containing water and an outlet for discharging a product water having a lowered oil content.

12. The system of claim 11, wherein the in-situ recovery method is a SAGD process or a CSS process.

13. The system of claim 11, further comprising:

an evaporator for distilling treated water to obtain distilled water, the treated water having been treated by the microfiltration membrane, and a drum-type boiler for generating steam from the distilled water, the steam being capable of using for recovering bitumen from the oil sand wells.

14. The system of claim 11, wherein the microfiltration membrane has hydrophilic properties.

15. The system of claim 11, wherein the system comprises a circulating flow filtration unit having a circulating flow line and a separation membrane module containing the microfiltration membrane installed in the circulating flow line.

* * * * *